J. B. KENT.
SEAM RIPPER.
APPLICATION FILED JULY 12, 1911. RENEWED DEC. 10, 1913.
1,098,578.  Patented June 2, 1914.
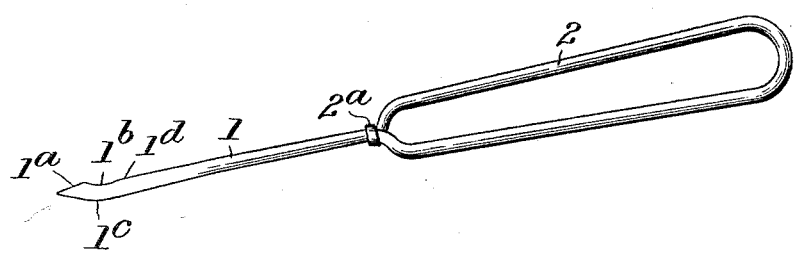
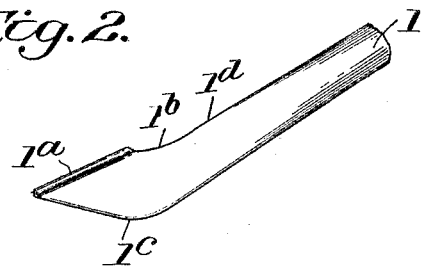
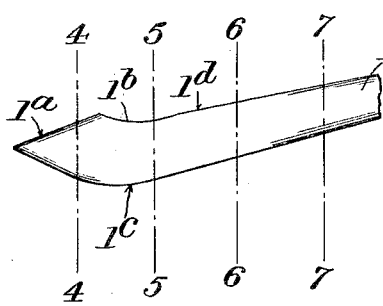
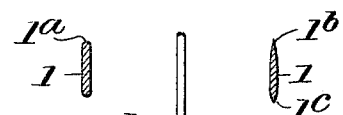
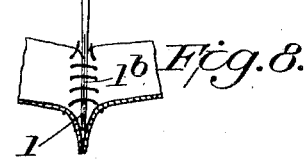

UNITED STATES PATENT OFFICE.

JEPTHA BRUNER KENT, OF MUSCATINE, IOWA.

SEAM-RIPPER.

1,098,578.

Specification of Letters Patent.

Patented June 2, 1914.

Application filed July 12, 1911, Serial No. 638,150. Renewed December 10, 1913. Serial No. 805,861.

*To all whom it may concern:*

Be it known that I, JEPTHA B. KENT, of Muscatine, in the county of Muscatine and State of Iowa, have invented certain new and useful Improvements in Seam-Rippers; and I hereby declare that the following is a full, clear, and exact description thereof, reference being had to the accompanying drawings, which form part of this specification.

This invention is a device for tailors, seamstresses, and others to use in ripping sewn seams; and the object of the invention is to provide a ripping knife by which such seams can be easily ripped and the threads cut without danger of cutting the goods.

The invention consists essentially in the peculiar construction of the blade of the knife, which blade may be attached to any suitable handle; I preferably however make the ripping knife of piano wire, one end of which is formed into the blade and the other part can be bent back upon itself to form the handle.

I will now describe such ripping knife with reference to the accompanying drawings which illustrate one practical,—and the at present preferred, construction thereof.

In said drawings: Figure 1 is a side view of a complete ripping knife, slightly larger than the actual working size. Fig. 2 is an enlarged perspective view of the blade thereof. Fig. 3 is an enlarged side elevation of the blade. Figs. 4, 5 and 6 7 are detail transverse sections of the blade on the lines 4, 5 6 and 7 respectively of Fig. 3. Fig. 8 is a detail view illustrating the mode of using the ripping knife.

As shown in the drawings the ripping knife comprises a blade 1, and a handle 2; the blade and handle are preferably formed of a single piece of wire; one portion of the wire being bent into a loop as shown in Fig. 1, to form the handle 2, the return end of the wire bent around the other portion thereof at the inner end of the handle, as shown at 2ª. The blade portion 1 is the most important part of the invention.

The blade has a triangular pointed head 1ª which is blunt both on its end and its upper and under edges, so that such head will not cut nor readily stick into the goods. The blade is preferably slightly curved in rear of the head so as to be concave on its upper side as at 1ᵇ, and slightly convex on its under side, as at 1ᶜ. The part 1ᵇ is keenly sharpened and such sharpened portion may be continued for a distance in rear of the part 1ᵇ, as indicated at 1ᵈ in the drawings, so that in case a number of stitches pass over the head 1ª they can be readily and certainly cut either by the sharp edge 1ᵇ or 1ᵈ. The part 1ᶜ may be thinned on its lower edge, but should not be made as sharp as the part 1ᵇ, as it is intended principally for use in removing or scraping the cut stitch threads from the goods.

The essential features of the ripping knife are the triangular blunt head and the sharp cutting edge 1ᵇ in rear of the head and preferably curved; and the blade should not be sharpened at all for about one-eighth of an inch from the point of the head which will effectively prevent it cutting the goods.

In using the device the goods may be pinned in the usual manner preparatory to ripping, and the sewn seam stretched so as to expose the stitches; then the operator inserts the point of the head of the ripping knife into the seams and lifts the stitches until he sees the point has not entered the goods, and then advances the blade along the seam, the stitches passing over the head and being cut by the edges 1ᵇ, 1ᵈ; and in this manner sewn seams can be ripped very rapidly. The dull pointed head of the ripper and the curved keen cutting edge effectively prevent cutting of the goods, which does not come into contact with the cutting edges 1ᵇ at all. I provide the dull point to pick and lift the stitches and enable the stitches to pass over the head of the cutting edge. The cutting edge is guarded by the head and by its curve, but I do not wish to be limited to the particular form of the cutting edge shown in the drawings, although now consider it the best and it has proved very efficient in practice.

Having thus described my invention what I therefore claim as new and desire to secure by Letters Patent thereon is:

1. An implement of the character described comprising a metal rod flattened at its operative end, and having dulled edges, the dulled edges of said flattened portion extending divergently rearwardly to approximately a quarter of an inch at an acute angle to the axis of the rod, and a concave cutting edge in the rear of the apex of the upper edge, all substantially as and for the purpose set forth.

2. An implement of the character described comprising a metal rod furnished with a handle at one end and having its opposite end flattened with the edges thereof rounded and extending rearwardly at divergent angles, a concave cutting edge in the rear of the apex of the upper edge, and a dulled convex edge approximately opposite thereof, all substantially as and for the purposes set forth.

3. As a new article of manufacture the within described ripping implement comprising a single strand of wire formed at one end into a handle and having its operative end flattened and provided with rounded edges extending rearwardly at divergent angles, a concave cutting edge in the rear of the apex of the upper edge, and a dulled convex edge approximately opposite thereto, all substantially as and for the purpose set forth.

In testimony that I claim the foregoing as my own, I affix my signature in presence of two witnesses.

JEPTHA BRUNER KENT.

Witnesses:
 GEO. HANKS,
 WM. HINGST.

---

Copies of this patent may be obtained for five cents each, by addressing the "Commissioner of Patents, Washington, D. C."